(12) United States Patent
Gaide

(10) Patent No.: US 12,235,671 B2
(45) Date of Patent: Feb. 25, 2025

(54) ADDING SOFT LOGIC TO FLUSH A PIPELINE AND REDUCE CURRENT RAMP

(71) Applicant: XILINX, INC., San Jose, CA (US)

(72) Inventor: Brian C. Gaide, Erie, CO (US)

(73) Assignee: XILINX, INC., San Jose, CA (US)

( * ) Notice: Subject to any disclaimer, the term of this patent is extended or adjusted under 35 U.S.C. 154(b) by 98 days.

(21) Appl. No.: 18/199,838

(22) Filed: May 19, 2023

(65) Prior Publication Data
US 2024/0385642 A1 Nov. 21, 2024

(51) Int. Cl.
G06F 1/00 (2006.01)
G06F 1/10 (2006.01)
(52) U.S. Cl.
CPC ...................................... G06F 1/10 (2013.01)
(58) Field of Classification Search
CPC ........................................................ G06F 1/10
See application file for complete search history.

(56) References Cited

U.S. PATENT DOCUMENTS

| | | | | |
|---|---|---|---|---|
| 8,873,576 B2* | 10/2014 | Kadu | ...................... | H04L 49/00 |
| | | | | 370/463 |
| 10,037,048 B1* | 7/2018 | Bourgeault | ......... | G06F 30/3312 |
| 10,067,550 B2* | 9/2018 | Journet | ................ | G06F 9/3869 |
| 10,187,063 B1* | 1/2019 | Scantlin | ................ | H03K 3/012 |
| 2006/0259748 A1* | 11/2006 | Lin | ....................... | G06F 9/3869 |
| | | | | 712/226 |
| 2018/0082720 A1* | 3/2018 | Richard | .................... | G06F 1/24 |
| 2018/0218104 A1* | 8/2018 | Atsatt | ..................... | G06F 30/34 |
| 2019/0271959 A1* | 9/2019 | Firu | ..................... | G05B 19/045 |
| 2023/0056686 A1* | 2/2023 | Hong | ............... | G11C 29/12015 |
| 2023/0205656 A1* | 6/2023 | Bhatia | ................... | G06F 11/273 |
| 2023/0213997 A1* | 7/2023 | Matta | .................... | G06F 1/3206 |
| | | | | 713/322 |
| 2023/0236685 A1* | 7/2023 | Chu | ...................... | G06F 1/3215 |
| | | | | 345/173 |

\* cited by examiner

Primary Examiner — Xuxing Chen
(74) Attorney, Agent, or Firm — Patterson + Sheridan, LLP

(57) ABSTRACT

An integrated circuit (IC) device includes a circuit comprising pipeline stages, and a controller circuitry configured to: load a static value into each of the pipeline stages based on a change in a clock enable (CE) signal, and sequentially deactivate each of the pipeline stages after a quantity of cycles of a reference clock signal that occur after the change of the CE signal, wherein the quantity of the cycles of the clock signal is based on a quantity of the pipeline stages.

20 Claims, 4 Drawing Sheets

ADDING SOFT LOGIC TO FLUSH A PIPELINE AND REDUCE CURRENT RAMP

TECHNICAL FIELD

Examples of the present disclosure generally relate to integrated circuits that include pipelining.

BACKGROUND

Pipelining, also known as pipeline processing, can be compared to a manufacturing assembly line. Pipelining is especially useful when processing a stream of data. A pipeline circuit is divided into pipeline stages. Each pipeline stage executes different operations simultaneously (or in parallel), which reduces overall processing time and improves the efficiency of a circuit.

Each pipeline stage includes at least one circuit element coupled to combinational circuitry. At least one circuit element, such as a flip-flop and a data register and the combinational circuitry make-up a pipeline stage. Because each pipeline circuit includes stages that are performing operations in parallel, pipeline circuits decrease latency and speed up processing.

SUMMARY

In one or more examples, an integrated circuit (IC) device includes a circuit comprising pipeline stages, and a controller circuitry configured to: load a static value into each of the pipeline stages based on a change in a clock enable (CE) signal, and sequentially deactivate each of the pipeline stages after a quantity of cycles of a reference clock signal that occur after the change of the CE signal, wherein the quantity of the cycles of the clock signal is based on a quantity of the pipeline stages.

In one or more examples, an integrated circuit (IC) device includes a circuit comprising a pipeline comprising a first stage comprising a first circuit element and a second stage comprising a second circuit element, first controller circuitry coupled to the first circuit element; and second controller circuitry coupled to the second circuit element, wherein the first controller circuitry is configured to reset the first circuit element based on a clock enable (CE) signal, and wherein the second controller circuitry is configured to reset the second circuit element based on a reset signal.

In one or more examples, an integrated circuit (IC) device includes a circuitry comprising pipeline comprising a first stage comprising a first circuit element and a second stage comprising a second circuit element; and a controller circuitry coupled to the first circuit element, wherein the controller circuitry is configured to reset the first circuit element based on a control enable (CE) signal, and wherein the second circuit element is configured to be reset based on a reset signal.

DETAILED DESCRIPTION

Typically pipelines can be activated and deactivated using a global clock enable (CE) signal. When an inactive pipeline (or pipelines) is then enabled by the global CE signal (i.e., transitions from a gated to ungated mode), the chip experiences a large current spike, since all pipeline stages in that circuit activate simultaneously. Similarly, when pipeline stages are disabled, they are all deactivated simultaneously and immediately by the global CE signal which also causes the chip to experience a large current spike.

Embodiments relate to an integrated circuit (IC) device including a pipeline that waits several cycles before deactivating the pipeline (e.g., before it transitions to an ungated mode) and forces in static logic into each stage of that pipeline. Thus, when the pipeline is enabled, the stages are at the same state. As a result, only the first stage in the pipeline draws significant current since it is getting new data. Soft logic can be used to force in static values into the stages of the pipeline while deactivating down the pipeline. Thus, the pipeline is flushed with static logic. Then, when deactivating the pipeline, only the first stage pulls power. Additional downstream pipeline stages turn on each cycle until all stages become activated, but the current ramp to the maximum active state is much shallower. Since power supply noise is a function of current ramp rate, reducing the ramp rate reduces noise and thus reduces performance loss or functionality concerns due to large current spikes.

Figure 1:
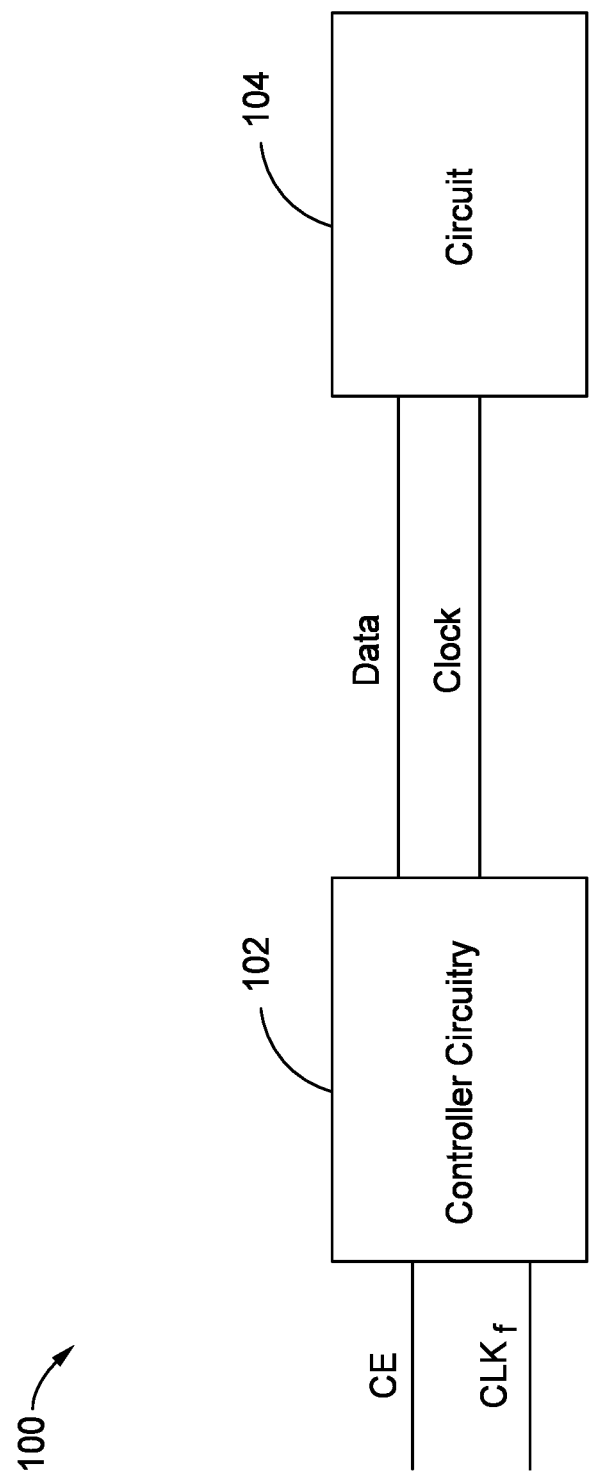
FIG. 1 illustrates a block diagram of an integrated circuit (IC) device according to one or more examples.

FIG. 1 illustrates a block diagram of an integrated circuit (IC) device 100 according to one or more examples. In one example, the IC device 100 includes a controller circuitry 102 coupled to a circuit 104. In one example, the circuit 104 includes pipelining. As understood by those with ordinary skill in the art, pipelining is a technique in which multiple circuit operations are performed in parallel. A pipeline includes pipeline stages that each include a circuit element coupled to combinational circuitry.

In one example, the circuit 104 includes at least one pipeline which includes at least two pipeline stages. Each of the pipeline stages are coupled in series. In one example, each pipeline stage includes a circuit element coupled in series to combinational circuitry. Circuit elements include, but are not limited to, data registers and/or flip-flops, such as a D-flip-flop, a J-K flip-flop, or the like.

An output of the combinational circuitry is coupled to an input of a next pipeline stage. Stated differently, an output of the combinational circuitry is coupled to an input of a next circuit element and an output of the next circuit element is coupled to an input of a next combinational circuitry. Then this is repeated for any quantity of pipeline stages. For example, a first pipeline stage includes a first circuit element having an output coupled to a first combinational circuitry, and a second pipeline circuitry includes a second circuit element having an input coupled to the first combinational circuitry and an output coupled to a second combinational circuitry. This is then replicated for any quantity of pipeline stages.

Each circuit element receives, holds, and then outputs data, and the combinational circuitry performs operations based on the data. In one example, each circuit element receives data as an input and are controlled based on a clock signal. The circuit elements hold a data input and output it based on the clock signal. For example, the circuit elements are positive edge triggered and are configured to output a held data input at each positive edge of the clock signal. In another example, the circuit elements are negative edge triggered and output a held data input at each negative edge of a clock signal.

In some examples, the circuit elements may receive a clock enable (CE) signal at an enable input. The circuit elements are active (i.e., operate) based on the CE signal. For example, when the CE signal is at a first logic level, such as logic level high, the circuit elements are active. When the CE signal is at logic level low the circuit elements are deactivated (or vice versa). When a circuit element is deactivated its output is frozen to its last held input. Stated differently when a circuit element is deactivated its output is frozen to the output it transmitted at the previous clock cycle.

In other examples, the circuit elements receive a reset signal. The circuit elements may be synchronously or asynchronously reset. The circuit elements are configured to reset their output based on a logic level of the reset signal. For example, the circuit elements are reset based on a logic level high or a logic level low reset signal.

Typically, as described above, the same clock signal and the CE signal are provided to each of the circuit elements. Stated differently, each of the circuit elements receive a global CE signal and a global clock signal. Therefore, all of the circuit elements are activated/deactivated at the same time. However, when the circuit elements are reactivated and have outputs frozen to the last data output while they were active, the IC device 100 experiences a large current spike. Therefore, as described herein, the controller circuitry 102 is configured to receive a CE signal and a reference clock signal $CLK_f$ and output a data signal and a global clock signal based on the CE signal and $CLK_f$ in order keep the circuit elements from deactivating until after a quantity of clock cycles while static logic is forced into each circuit element to prevent the current ramp during reactivation.

Figure 2:
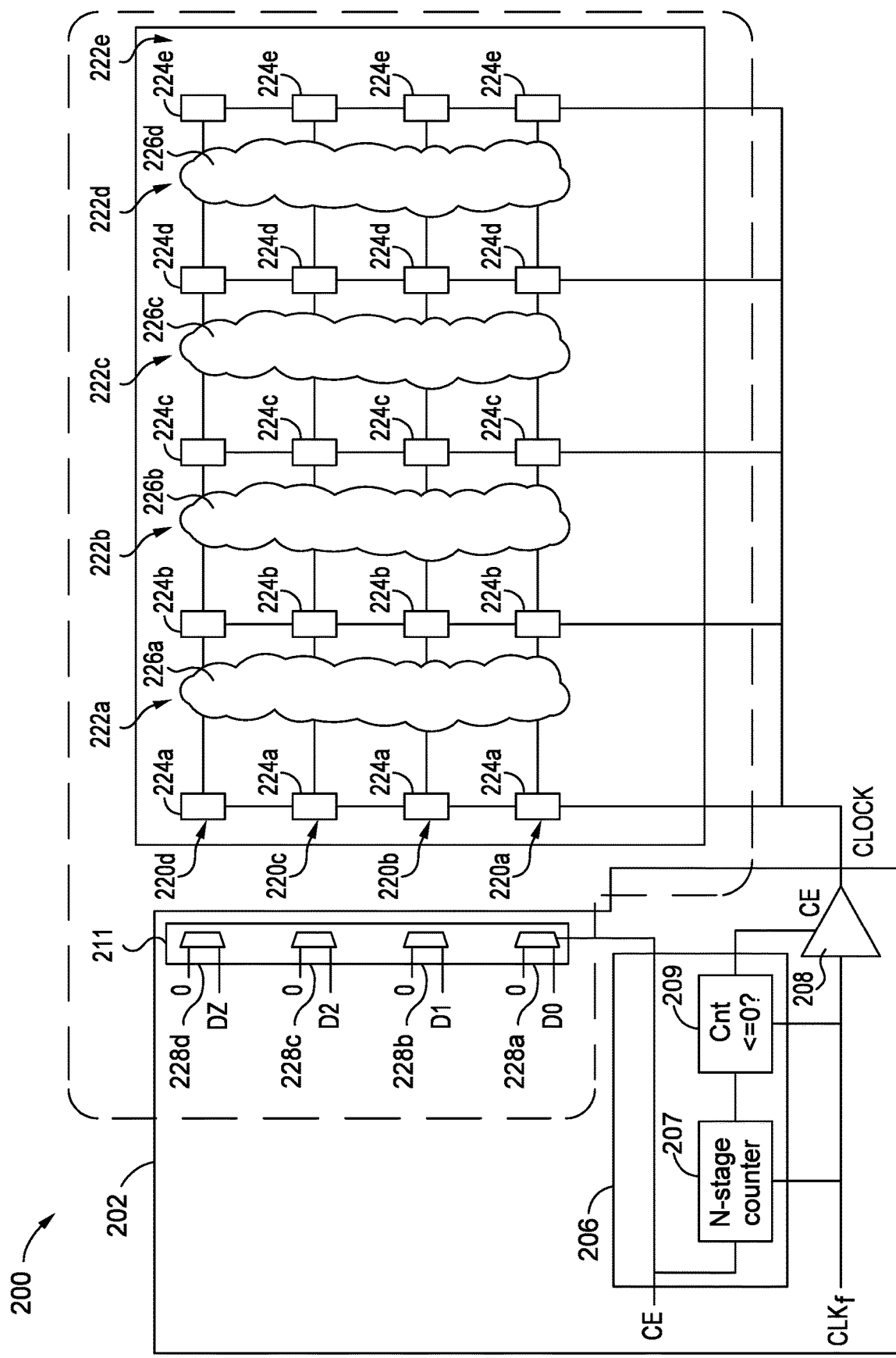
FIG. 2 illustrates is a more detailed schematic of the schematic of FIG. 1 according to one or more examples.

FIG. 2 illustrates an example of an IC device 200 according to one or more examples. The IC device 200 includes controller circuitry 202 coupled to a circuit 203. The circuit 203 includes pipelines. For example, the circuit 203 includes a first pipeline 220a, a second pipeline 220b, a third pipeline 220c, and a fourth pipeline 220d. Even though the circuit 203 is illustrated as having four pipelines, this is for example purposes only. The circuit 203 includes any suitable quantity of pipelines.

Each pipeline 220a-220d includes pipeline stages. For, example each of the pipelines 220a-220d includes five pipeline stages. For example, each of the pipelines a first pipeline stage 222a, a second pipeline stage 222b, a third pipeline stage 222c, a fourth pipeline stage 222d, and a fifth pipeline stage 222e. Although each of the pipelines 220a-220d are illustrated having five pipeline stages, each of the pipelines 220a-220d may have any suitable quantity of pipeline stages. Also, each of the pipelines 220a-220d may have an equal or unequal quantity of pipeline stages.

Each of the pipeline stages 222a-222e are coupled in series. Each of the pipeline stages 222a-222e include at least one circuit element coupled to a corresponding combinational circuitry. Each of the pipelines 220a-220d may include an individual combinational circuitry or may each share a combinational circuitry. In one example, each of the pipeline stages 222a-222e includes a circuit element coupled to a combinational circuitry in series. For example, the first pipeline stage 222a includes first circuit elements 224a coupled to first combinational circuitry 226a. The second pipeline stage 222b includes second circuit elements 224b coupled to second combinational circuitry 226b. The third pipeline stage 222c includes third circuit elements 224c coupled to third combinational circuitry 226c. The fourth pipeline stage 222d includes fourth circuit elements 224d coupled to fourth combinational circuitry 226d. The fifth pipeline stage 222e includes fifth circuit elements 224e coupled to fifth combinational circuitry (not shown).

Each circuit element 224a-224e receives, holds, and then outputs data, and the combinational circuitry performs operations based on the data. For example, the first circuit elements 224a receive data from the controller circuitry 202, and provide the data to the first combinational circuitry 226a. The first combinational circuitry 226a performs operations based on the received data and outputs data to the second circuit elements 224b, and so on. In one example, each of the circuit elements 224a-224e are controlled based a clock signal provided by the controller circuitry 202. Each of the circuit elements 224a-224e receive a same clock signal from the controller circuitry 202. Stated differently, the clock signal is global. The circuit elements 224a-224e transmit their respective outputs based on the clock signal. For example, the circuit elements 224a-224e are positive edge triggered and output a held data input at each positive edge of the clock signal. In another example, the circuit elements are negative edge triggered and output a held data input at each negative edge of a clock signal.

In one example, the controller circuitry 202 includes a counter circuitry 206, a clock buffer 208, and a look-up table (LUT) circuitry 211 coupled to an input of each of the pipelines 220-220e.

The controller circuitry 202 provides data signals and a clock signal to each of the pipelines 220a-220d based on the CE signal and a reference clock signal $CLK_f$. Stated differently, the controller circuitry 202 provides a global clock signal to each of the circuit elements 224a-224e, and controls the data provided to each of the pipelines 220a-220d based on the CE signal in lieu of a global CE signal being provided to each of the circuit elements 224a-224e and/or directly controlling the clock buffer 208 using the CE signal. In one example, the LUT circuitry 211 is coupled to each first circuit element 224a of each of the pipelines 222a-222d. In other examples, each LUT circuitry is coupled to each first gated (i.e., clocked) circuit element of each stage. In one example, the LUT circuitry 211 is implemented as logic circuitry coupled to each of the pipelines 220a-220d. Each logic circuitry is implemented to receive at least two inputs. A first input that receives a data signal including data that is to be transmitted to each of the pipelines, and second input that receives the CE signal. Each logic circuitry is implemented such that each logic circuitry output is based on the CE signal. For example, the logic circuitry may be implemented as N:1 multiplexers (muxes) where N is equal to an integer greater than or equal to 2, AND logic gates, or the like. For example, the LUT circuitry 211 is implemented as 2:1 muxes coupled to each of the pipelines 220a-220d. The LUT circuitry 211 is implemented as a first mux 228a coupled to a first circuit element 224a of the first pipeline 220a, a second mux 228b coupled to a first circuit element 224a of the second pipeline 220b, a third mux 228c coupled to a first circuit element 224a of the third pipeline 220c, and a fourth mux 228d coupled to a first circuit element 224a of the fourth pipeline 220d. Each mux 228a-228d receives a data input at a first input. For example, each of the muxes 228a-228d receives a data signal $D_z$, where Z is an integer equal to the index of the pipeline. For example, the first mux 228a coupled to the first pipeline 220a receives data signal $D_0$, the second mux 228b coupled to the second pipeline 220b receives data signal $D_1$, and so on. Each of the muxes 228a-228d receives the CE signal at a second input, and static logic at a third input. The CE signal is a global signal provided to each mux 228a-228d. Static logic, herein, may be defined as logic level low data used to force each of the circuit elements 224a-224b to the same state prior to deactivation. Therefore, the each mux 228a-228d is configured to transmit either data included in the data signal or the static logic based on the CE signal. This will be described in more detail below.

The counter circuitry 206 includes a stage counter 207 and a confirmation circuitry 209. The stage counter 207 receives the CE signal and $CLK_f$, and updates a count value based on the quantity of stages of each of the pipelines 220a-220d and the CE signal. In one example, the stage counter 207 is preset with a count value equal to the quantity of stages in each pipeline and decrements the count value after each $CLK_f$ cycle that occurs after a change in the CE signal. For example, a change in the CE signal includes the CE signal changing from asserted (i.e., logic level high) to deasserted (i.e., logic level low) or vice versa. In another example, the stage counter 207 starts with a count value equal to zero and counts the quantity of $CLK_f$ cycles that occur after a change in the CE signal. This will be described in more detail below.

A confirmation circuitry 209 receives the count value from the stage counter 207. The confirmation circuitry 209 provides an input enable signal to a first input of the clock buffer 208 based on the count value. Using the input enable signal, the confirmation circuitry 209 deactivates the clock buffer 208 based on the count value. The clock buffer 208 receives the input enable signal at the first input and $CLK_f$ at a second input, and outputs a global clock signal to each of the circuit elements 224a-224e based on the input enable signal. This will be described in more detail below.

In one example, during normal operation (i.e., when the circuit elements 224a-224e are activated and data is being processed by the circuit 203) the CE signal is set to a first logic level (asserted), such as logic level high. While the CE signal is set to the first logic level and the circuit elements 224a-224e are active, each of the muxes 228a-228d output data based on the received data signal. The stage counter 207 maintains a count value equal to the quantity of pipeline stages. In this example, because the stage counter 207 is decrementing the count value, the confirmation circuitry 209 compares the count value to zero. As long as the count value is greater than zero, the confirmation circuitry 209 outputs an input enable signal having a logic level that forces the clock buffer 208 to remain active. Stated differently, while the count value is greater than zero, the clock buffer 208 remains active. While the clock buffer 208 is active, the output of the clock buffer 208 (the global clock signal) is the same as $CLK_f$, and continues pulsing. As soon as it is time for the pipeline stages to be deactivated, the CE signal changes to a second logic level (is deasserted), such as logic level low. This causes each of the muxes 228a-228d to now output the static logic instead of the data based on the data signal. The change in the CE signal now causes the stage counter 207 to begin decrement the count value at each $CLK_f$ cycle. Stated differently, the confirmation circuitry 209 halts changing the input enable signal to the second logic level, until the count value is equal to zero.

Advantageously, instead globally deactivating each of the pipelines 220a-220d simultaneously using the CE signal, the circuit elements 224a-224e remain active for a quantity of $CLK_f$ cycles that occur after the change in the CE signal. In one example, the quantity of CLK cycles that occur after the change in the CE signal is equal to the quantity of pipeline stages.

While the count value remains greater than zero, because the input enable signal provided to the clock buffer 208 keeps the clock buffer 208 active, the static logic is fed across each subsequent pipeline stage at each subsequent cycle of the global clock signal provided by the clock buffer 208. Stated differently, even though the CE signal is deasserted, the clock signal output by the clock buffer 208 follows $CLK_f$. For example, at a first clock signal cycle after the change in the CE signal, static logic is provided to the first circuit elements 224a, at a second clock signal cycle after the change in the CE signal, the static logic is provided to the second circuit elements 224b, and so on until the count value is equal to zero. Thus, once the count value is equal to zero, five clock signal cycles after the change in the CE signal, the input enable signal is changed to a second logic level, causing the clock buffer 208 to deactivate. Stated differently, the clock signal output by the clock buffer 208 remains at logic level low (or logic level high if the circuit elements are negative edge triggered) and the circuit elements 224a-224e are deactivated sequentially. Advantageously, when the CE signal is changed back to the first logic level the count value is reset and each of the circuit elements 224a-224d are reactivated without experiencing the current ramp described above due to their stored static logic values.

In another example, the stage counter 207 is configured to increment (i.e., start at zero). In this example the confirmation circuitry 209 stores the quantity of pipeline stages and maintains the input enable signal that keeps the clock buffer 208 asserted until the count value equals the quantity of pipeline stages.

Figure 3:
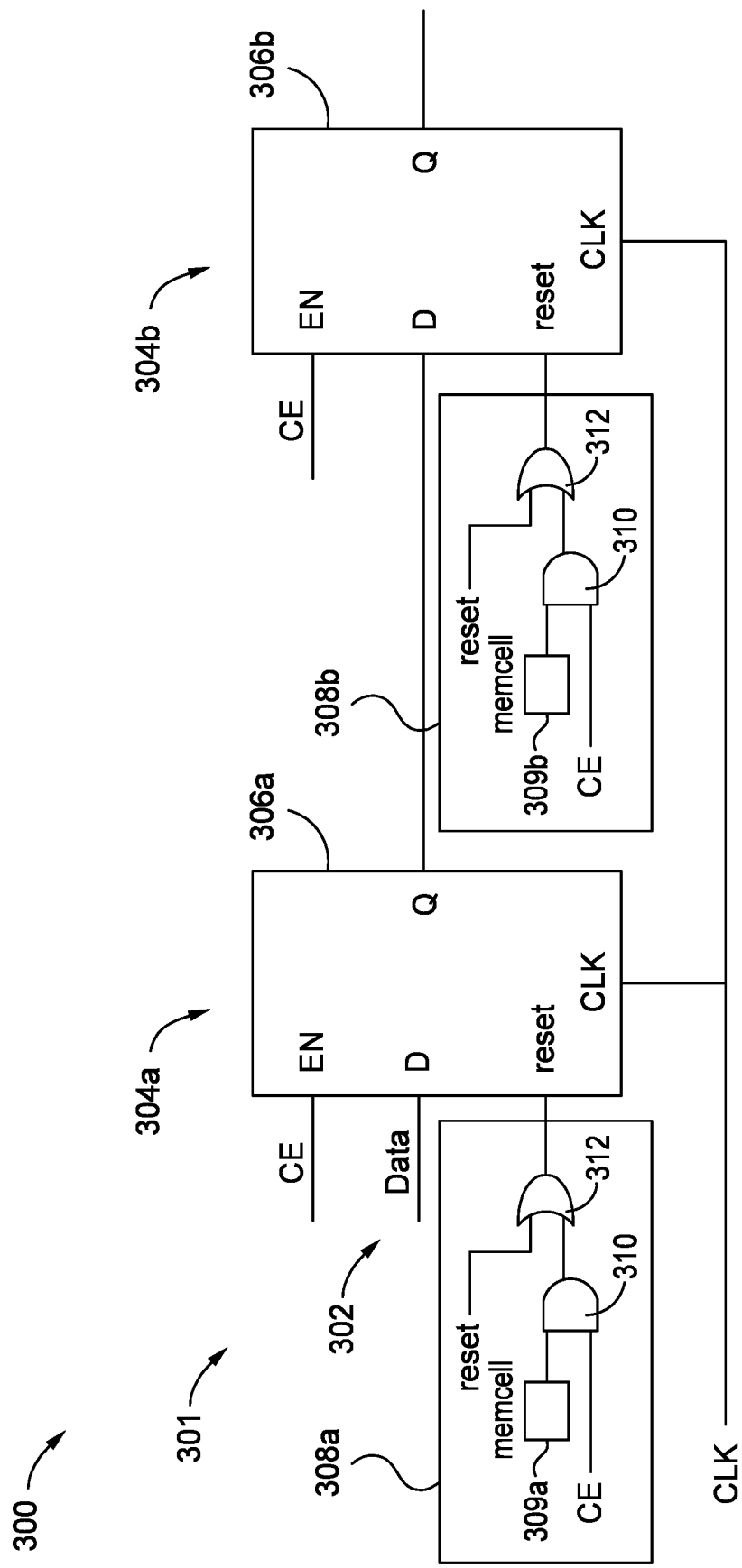
FIG. 3 illustrates a schematic of an IC device according to one or more examples.

In one example, a controller circuitry is embedded in the circuit 104. FIG. 3 illustrates a schematic of an IC device 300 according to one or more examples. IC device 300 includes circuit 301 which includes embedded (hardened) controller circuitry. The circuit 301 includes at least one pipeline. For example the circuit 301 includes pipeline 302. Although the circuit 301 is illustrated as including only one pipeline, the quantity of pipelines included in the circuit 301 is not limited. The pipeline 302 includes at least two pipeline stages. In one example, a first pipeline stage 304a is coupled to a second pipeline stage 304b. Although the pipeline 302 is illustrated as including only two pipeline stages, the quantity of pipeline stages included in the pipeline 302 is not limited. The first pipeline stage 304a includes a first circuit element 306a coupled to combinational circuitry (not shown). The second pipeline stage 304b includes a second circuit element 306b coupled to combinational circuitry (not shown). The output of the first pipeline stage 304a is coupled to the input of the second pipeline stage 304b.

In one example, the first circuit element 306a and the second circuit element 306b include a clock input (CLK), a reset input, a data input (D), and an enable input (EN). The first circuit element 306a and the second circuit element 306b each receive a same (global) clock signal (CLK). The first circuit element 306a receives data at the data input, holds the data, and then outputs the data to the corresponding combinational circuitry based on the clock signal. The combinational circuitry corresponding the first pipeline stage 304a performs operations based on the received data, and outputs processed data to the second circuit element 306b. The second circuit element 306b receives the processed data from the combinational circuitry corresponding to the first pipeline stage 304a, holds the data, and outputs the processed data to a corresponding combinational circuitry based on the clock signal.

The first circuit element 306a and the second circuit element 306b hold a data input and output it based on the clock signal. For example, the first circuit element 306a and the second circuit element 306b are positive edge triggered and are configured to output a held data input at each positive edge of the clock signal. In another example, the first circuit element 306a and the second circuit element 306b are negative edge triggered and output a held data input at each negative edge of the clock signal.

In some examples, the first circuit element 306a and the second circuit element 306b receive a CE signal at the enable input. The first circuit element 306a and the second circuit element 306b are active (i.e., operate) based on the enable signal. The CE signal is used to freeze the state of the first circuit element 306a and the second circuit element 306b. For example, when the CE signal is at a first logic level, such as logic level high, the first circuit element 306a and the second circuit element 306b are active. When the first circuit element 306a and the second circuit element 306b are active, they each output their received (and held) data input at each clock signal cycle. When the CE is at logic level low the first circuit element 306a and the second circuit element 306b are deactivated. As described above, when the first circuit element 306a and the second circuit element 306b are deactivated the outputs of the first circuit element 306a and the second circuit element 306b are frozen.

In other examples, the first circuit element 306a and the second circuit element 306b receive a reset signal at the reset input. The first circuit element 306a and the second circuit element 306b may be synchronously or asynchronously reset. The first circuit element 306a and the second circuit element 306b are configured to reset their output based on a logic level of the reset signal. For example, the first circuit element 306a and the second circuit element 306b are reset based on a logic level high or a logic level low reset signal.

Typically, as described above, the same clock signal, reset signal, and CE signal are provided the first circuit element 306a and the second circuit element 306b. Therefore, all of the circuit elements are activated/deactivated at the same time. However, when the circuit elements are reactivated, the IC device 300 experiences a large current spike. Therefore, as described herein, the controller circuitry is configured to keep the circuit elements from deactivating until after a quantity of clock cycles.

The first circuit element 306a and the second circuit element 306b may each be coupled to a controller circuitry. The first circuit element 306a is coupled to a first controller circuitry 308a and the second circuit element 306b is coupled to a second controller circuitry 308b.

The first controller circuitry 308a includes a first memory cell 309a, an AND logic gate 310, and an OR logic gate 312. In one example, the first memory cell 309a always outputs a first memory signal equal to a first logic level, such as logic level high. In one example, the AND logic gate 310 is a two-input AND logic gate. The AND logic gate 310 receives the first memory signal and the global CE signal at each of its inputs. The OR logic gate 312 is a two-input OR logic gate. The OR logic gate 312 receives the output of the AND logic gate 310 and the reset signal as inputs. The first circuit element 306a receives the output from the OR logic gate 312 at the reset input. Advantageously, this allows for the CE signal to override the reset signal. Because the first memory signal is always at logic level high, the output of the AND logic gate 310 follows the logic value of the CE signal. Further, if the CE signal is logic level high, the output of the OR logic gate 312, and thus, the signal provided to the reset input of the first memory device will be logic level high. Therefore, when the first circuit element 306a is deactivated, instead of outputting its previously stored input, it is reset by the CE signal and will output static logic to the second circuit element 306b.

The second controller circuitry 308b includes a second memory cell 309b, AND logic gate 310, and the OR logic gate 312. In one example, the second memory cell 309b always outputs a second memory signal equal to a second logic level different from the first logic level, such as logic level low. Each subsequent circuit element includes controller circuitry configured in the same manner as the second controller circuitry 308b. For example, a third circuit element included in a third pipeline stage (not shown) would include a third controller circuitry that includes a third memory cell that outputs a third memory signal at the second logic level and includes the AND logic gate 310 and the OR logic gate 312. The second circuit element 306b receives the output from the OR logic gate 312 at the reset input. In the second controller circuitry 308b, the reset signal is not overridden by the CE signal, because the output of the AND logic gate 310 will always be equal to the second logic level. This allows the static logic output by the first circuit element 306a caused by the reset to propagate to each subsequent stage and prevent the current ramp, described above, upon reactivation. Stated differently the first circuit element 306a is reset based on the CE signal, whereas each subsequent circuit element is reset based on the reset signal.

Figure 4:
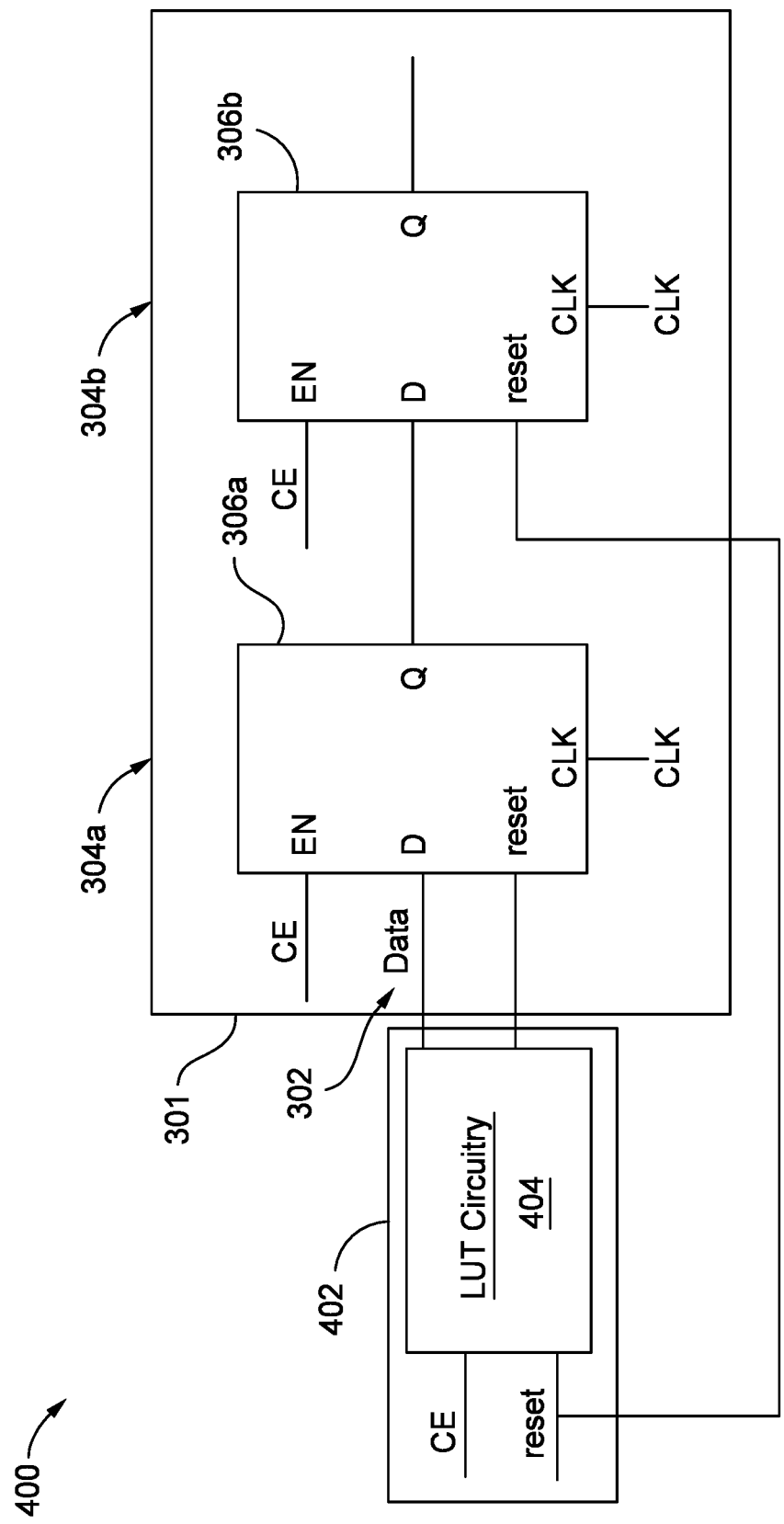
FIG. 4 illustrates a schematic of an IC device according to one or more examples

FIG. 4 illustrates an IC device 400 according to one or more examples. The IC device 400 includes at least one pipeline. For example the circuit 301 includes pipeline 302. The pipeline 302 includes at least two stages. In one example, the first pipeline stage 304a is coupled to a second pipeline stage 304b. The first pipeline stage 304a includes a first circuit element 306a coupled to combinational circuitry (not shown). The second pipeline stage 304b includes a second circuit element 306b coupled to combinational circuitry (not shown). The output of the first pipeline stage 304a is coupled to the input of the second pipeline stage 304b. As described above, the quantity of pipelines and pipeline stages are not limited.

The IC device 400 includes a controller circuitry 402 comprising a LUT circuitry 404 coupled to the first circuit element 306a (i.e., the first pipeline stage 304a). In one example, the LUT circuitry 404 is implemented as an OR logic gate. The LUT circuitry 404 provides an output to the reset input of the first circuit element 306a based on the CE signal. The reset input of the second circuit element 306b and each subsequent circuit element receives the reset signal. For example, the second circuit element 306b of the second pipeline stage 304b, a third circuit element of a third stage (not shown), and so on, have reset inputs that receive the reset signal. Stated differently, the reset input of only the first circuit element 306a is coupled to the LUT circuitry 404. Advantageously, the LUT circuitry 404 of controller circuitry 402 allows the CE signal to control when the first circuit element 306a resets. For example, if the CE signal is logic level high, the first circuit element 306a receives a logic level high input, regardless of the state of the CE signal. Therefore, when the CE signal can override the reset signal provided to the first circuit element 306a.

What is claimed is:

1. An integrated circuit (IC) device comprising:
a circuit comprising pipeline stages; and
controller circuitry configured to:
load a static value into each of the pipeline stages based on a change in a clock enable (CE) signal, and
sequentially deactivate each of the pipeline stages after a quantity of cycles of a reference clock signal that occur after the change of the CE signal, wherein the quantity of cycles of the reference clock signal is based on a quantity of the pipeline stages.

2. The IC device of claim 1, wherein the controller circuitry further comprises:
a clock buffer coupled to each of the pipeline stages, the clock buffer configured to deactivate each of the pipeline stages after the quantity of cycles of the reference clock signal.

3. The IC device of claim 2, wherein the controller circuitry further comprises:
a counter circuitry configured to receive the CE signal and the reference clock signal, count the quantity of cycles of the reference clock signal based on the change in the CE signal, and halt changing an input enable signal to the clock buffer until the quantity of cycles of the reference clock signal is equal to the quantity of the pipeline stages.

4. The IC device of claim 1, wherein the quantity of cycles of the reference clock signal is equal to the quantity of the pipeline stages.

5. The IC device of claim 1, wherein the controller circuitry comprises:
look-up table (LUT) circuitry coupled to a first stage of each of the pipeline stages, the LUT circuitry configured to receive a data signal and the CE signal, and output either the data signal or static logic based on the CE signal.

6. The IC device of claim 5, wherein the LUT circuitry is configured to output the data signal based on the CE signal being asserted.

7. The IC device of claim 5, wherein the LUT circuitry is configured to output the static logic based on the CE signal being deasserted.

8. The IC device of claim 5, wherein the LUT circuitry comprises a multiplexer or an AND logic gate that are configured to control an input provided to the first stage of each of the pipeline stages based on the CE signal.

9. An integrated circuit (IC) device comprising:
a circuit comprising a pipeline comprising a first stage comprising a first circuit element and a second stage comprising a second circuit element;
first controller circuitry coupled to the first circuit element; and
second controller circuitry coupled to the second circuit element, wherein the first controller circuitry is configured to reset the first circuit element based on a clock enable (CE) signal, and wherein the second controller circuitry is configured to reset the second circuit element based on a reset signal.

10. The IC device of claim 9, wherein the first controller circuitry comprises a first memory cell configured to output a first memory signal having a first logic level, and the second controller circuitry comprises a second memory cell configured to output a second memory signal equal to a second logic level.

11. The IC device of claim 10, wherein the pipeline further comprises a third stage comprising a third circuit element, wherein the IC device further comprises a third controller circuitry coupled to the third circuit element, and wherein the third controller circuitry comprises a third memory cell configured to output a third memory signal equal to the second logic level.

12. The IC device of claim 10, wherein the first controller circuitry further comprises:
an AND logic gate configured to receive the first memory signal and the CE signal; and
an OR logic gate configured to receive an output of the AND logic gate and the reset signal, and provide an output signal to the first circuit element based on the output of the AND logic gate and the reset signal.

13. The IC device of claim 12, wherein the output signal is configured to reset the first circuit element if at least one of the CE signal and the reset signal is equal to the first logic level.

14. An integrated circuit (IC) device comprising:
a circuitry comprising pipeline comprising a first stage comprising a first circuit element and a second stage comprising a second circuit element; and
a controller circuitry coupled to the first circuit element, wherein the controller circuitry is configured to reset the first circuit element based on a control enable (CE) signal, and wherein the second circuit element is configured to be reset based on a reset signal.

15. The IC device of claim 14, wherein the controller circuitry comprises a look-up table (LUT) circuitry.

16. The IC device of claim 15, wherein the LUT circuitry is configured to receive the CE signal and the reset signal and output an output signal to the first circuit element based on the CE signal and the reset signal.

17. The IC device of claim 16, wherein the output signal is configured to reset the first circuit element based on at least one of the CE signal and the reset signal being equal to a first logic level.

18. The IC device of claim 14, wherein the second circuit element is reset based on the reset signal being equal to a first logic level.

19. The IC device of claim 14, further comprising a third stage comprising a third circuit element configured to receive the reset signal.

20. The IC device of claim 19, wherein the third circuit element is configured to be reset based on the reset signal being equal to a first logic level.

* * * * *